(12) United States Patent
Cappiello et al.

(10) Patent No.: US 9,183,317 B1
(45) Date of Patent: Nov. 10, 2015

(54) SYSTEM AND METHOD FOR EXPORTING REPORT RESULTS FROM A REPORTING SYSTEM

(75) Inventors: Scott Cappiello, Arlington, VA (US); William Hurwood, Washington, DC (US); Benjamin Z. Li, Great Falls, VA (US); Luis V. Orozco, Vienna, VA (US); Ramkumar Ramachandran, Reston, VA (US); Gaurav Rewari, New York, NY (US); Jun Yuan, Sterling, VA (US)

(73) Assignee: MICROSTRATEGY INCORPORATED, McLean, VA (US)

( * ) Notice: Subject to any disclaimer, the term of this patent is extended or adjusted under 35 U.S.C. 154(b) by 1794 days.

(21) Appl. No.: 09/884,468

(22) Filed: Jun. 20, 2001

(51) Int. Cl.
*G06F 17/00* (2006.01)
*G06F 17/30* (2006.01)

(52) U.S. Cl.
CPC .... *G06F 17/30896* (2013.01); *G06F 17/30563* (2013.01)

(58) Field of Classification Search
CPC .................. G06F 17/30896; G06F 17/30667; G06F 17/30563; G06F 17/30569; G06F 17/24
USPC .......... 715/530, 255, 234, 200, 209; 707/2, 4, 707/6, 100, 705, 821, 822; 709/227
See application file for complete search history.

(56) References Cited

U.S. PATENT DOCUMENTS

| | | | |
|---|---|---|---|
| 4,688,195 A | 8/1987 | Thompson et al. | |
| 4,829,423 A | 5/1989 | Tennant et al. | |
| 5,197,005 A | 3/1993 | Shwartz et al. | |
| 5,276,870 A | 1/1994 | Shan et al. | |
| 5,418,943 A | 5/1995 | Borgida et al. | |
| 5,421,008 A | 5/1995 | Banning et al. | |
| 5,555,403 A | 9/1996 | Cambot et al. | |
| 5,584,024 A | 12/1996 | Shwartz | |
| 5,642,505 A * | 6/1997 | Fushimi | 1/1 |
| 5,664,182 A | 9/1997 | Nierenberg et al. | |
| 5,692,181 A | 11/1997 | Anand et al. | |
| 5,696,702 A * | 12/1997 | Skinner et al. | 702/186 |
| 5,724,556 A * | 3/1998 | Souder et al. | 703/2 |
| 5,864,856 A | 1/1999 | Young | |

(Continued)

OTHER PUBLICATIONS

Microsoft Corporation "MCSE Training Kit (Exam 70-228):Microsoft SQL Server 200 System Administration", http://www.microsoft.com/mspress/books/ sampchap/4885.asp#SampleChapter, sample chapter 7, clicking on lesson 5, published Mar. 2001, pp. 1-6.*

(Continued)

*Primary Examiner* — Thu Huynh
(74) *Attorney, Agent, or Firm* — Hunton & Williams LLP (57) ABSTRACT

A technique for exporting results from a reporting system report in a format type including a datamart, PDF file, flat file, Excel™ file, HTML file, and XML file or in another relational database management system (RDBMS) format. In one embodiment, the technique is realized through a method and a system for automatically exporting results from a business intelligence, OLAP, or other reporting system. One embodiment of the present invention involves a method of enabling a user to designate a report desired for execution as an export-report. When the report is processed, the report is exported into a datamart or other format and made available for access by the user through one or more different types of user devices. The user may then further manipulate or export the results from the datamart to a file type as desired.

22 Claims, 5 Drawing Sheets

(56) References Cited

U.S. PATENT DOCUMENTS

| | | | |
|---|---|---|---|
| 5,890,140 A * | 3/1999 | Clark et al. ................ | 705/35 |
| 5,914,878 A | 6/1999 | Yamamoto et al. | |
| 5,966,695 A * | 10/1999 | Melchione et al. ............ | 705/10 |
| 6,003,022 A * | 12/1999 | Eberhard et al. ................ | 707/2 |
| 6,004,276 A * | 12/1999 | Wright et al. ................ | 600/508 |
| 6,138,121 A * | 10/2000 | Costa et al. ................ | 715/513 |
| 6,154,766 A | 11/2000 | Yost et al. | |
| 6,185,556 B1 * | 2/2001 | Snodgrass et al. ............ | 707/687 |
| 6,235,176 B1 * | 5/2001 | Schoen et al. ................ | 1/1 |
| 6,247,008 B1 | 6/2001 | Cambot et al. | |
| 6,253,197 B1 * | 6/2001 | Lindsay et al. ............ | 707/769 |
| 6,259,977 B1 * | 7/2001 | Mayer et al. ................ | 701/14 |
| 6,260,050 B1 * | 7/2001 | Yost et al. ................ | 715/202 |
| 6,279,033 B1 | 8/2001 | Selvarajan et al. | |
| 6,356,901 B1 * | 3/2002 | MacLeod et al. ................ | 707/6 |
| 6,408,302 B1 * | 6/2002 | Lee et al. ................ | 707/102 |
| 6,453,310 B1 * | 9/2002 | Zander ................ | 1/1 |
| 6,549,922 B1 * | 4/2003 | Srivastava et al. ................ | 1/1 |
| 6,965,891 B1 * | 11/2005 | Jakobsson et al. ............ | 707/714 |
| 7,016,903 B1 * | 3/2006 | Thusoo et al. ................ | 1/1 |
| 7,058,587 B1 * | 6/2006 | Horne ................ | 705/7 |
| 7,483,851 B1 * | 1/2009 | Brixius et al. ................ | 705/37 |
| 2002/0032676 A1 * | 3/2002 | Reiner et al. ................ | 707/3 |
| 2002/0128954 A1 * | 9/2002 | Evans ................ | 705/37 |
| 2002/0191035 A1 * | 12/2002 | Selent ................ | 345/866 |
| 2002/0198976 A1 * | 12/2002 | Davenport ................ | 709/223 |
| 2004/0078236 A1 * | 4/2004 | Stoodley et al. ................ | 705/2 |

OTHER PUBLICATIONS

U.S. Appl. No. 60/293,441.*

Robert C. Stern, Bruce M. Anderson and Craig W. Thompson, A Menu-Based Natural Language Interface to a Large Database, Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces to Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of the University of Texas at Austin, May 1984.

Business Objects User's Guide Version 5.1 (electronic copy on enclosed CD).

Getting Started-with Business Objects Version 5.1 (electronic copy on enclosed CD).

Business Objects Deployment Guide (electronic copy on enclosed CD).

Broadcast Agent 5.1 (electronic copy on enclosed CD).

Business Objects 5.1 (electronic copy on enclosed CD).

Web Intelligence 2.6 (electronic copy on enclosed CD).

Business Objects Designer's Guide Version 5.1 (electronic copy on enclosed CD).

Business Objects Error Message Guide Version 5.1 (electronic copy on enclosed CD).

Business Objects Generic ODBC Access Guide Version 5.1 (electronic copy on enclosed CD).

Business Objects Info View User's Guide (electronic copy on enclosed CD).

Business Objects Installation and Upgrade Guide (electronic copy on enclosed CD).

Business Objects MS Access Database Guide Version 5.1 (electronic copy on enclosed CD).

Business Objects MS SQL Server Database Guide Version 5.1 (electronic copy on enclosed CD).

Business Objections Supervisor's Guide Version 5.1 (electronic copy on enclosed CD).

Quick Start MicroStrategy Agent Version 6.0 (electronic copy on enclosed CD).

User Guide MicroStrategy Agent Version 6.0 (electronic copy on enclosed CD).

User Guide MicroStrategy Architect Version 6.0 (electronic copy on enclosed CD).

User Guide MicroStrategy Objects Version 6.0 (electronic copy on enclosed CD).

Excel Add-In MicroStrategy Objects Version 6.0 (electronic copy on enclosed CD).

User Guide MicroStrategy Intelligence Server Version 6.0 (electronic copy on enclosed CD).

User Guide MicroStrategy Administrator Version 6.0 (electronic copy on enclosed CD).

Administrator Guide MicroStrategy Administrator Version 6.5 (electronic copy on enclosed CD).

* cited by examiner

SYSTEM AND METHOD FOR EXPORTING REPORT RESULTS FROM A REPORTING SYSTEM

FIELD OF THE INVENTION

The present invention relates generally to datamarting and, more particularly, to datamarting in a reporting system.

BACKGROUND

Data warehouses, relational databases, and datamarts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A datamart may be considered to be a type of data warehouse that focuses on a particular business segment.

Decision support systems have been developed to efficiently retrieve selected information from data warehouses. One type of decision support system is known as an on-line analytical processing system ("OLAP"). In general, OLAP systems analyze the data from a number of different perspectives and support complex analyses against large input data sets. OLAP systems generate output upon execution of a report that includes a template to indicate the way to present the output and a filter to specify the conditions of data on which the report is to be processed.

Reports from OLAP, business intelligence or other reporting systems, may be extremely large and difficult to navigate. Additionally, common systems enable access of a report through a computer interface with limited options for presentation.

Also, reports from OLAP business intelligence or other reporting systems are useful in the way data has been processed to identify interesting trends and anomalies not apparent in raw data. However, integration of these report results with other data processing systems is not available in common systems.

SUMMARY OF THE INVENTION

These and other drawbacks in existing systems are overcome through a technique for exporting results from a reporting system report in a format type including a datamart, PDF file, flat file, Excel™ file, HTML file, and XML file or in another relational database management system (RDBMS) format. In one embodiment, the technique is realized through a method and a system for automatically exporting results from a business intelligence, OLAP, or other reporting system.

One embodiment of the present invention involves a method of enabling a user to designate a report desired for execution as an export-report. When the report is processed, the report is exported into a datamart or other format and made available for access by the user through one or more different types of user devices. The user may then further manipulate or export the results from the datamart to a file type as desired.

DETAILED DESCRIPTION OF PREFERRED EMBODIMENTS

Figure 2:
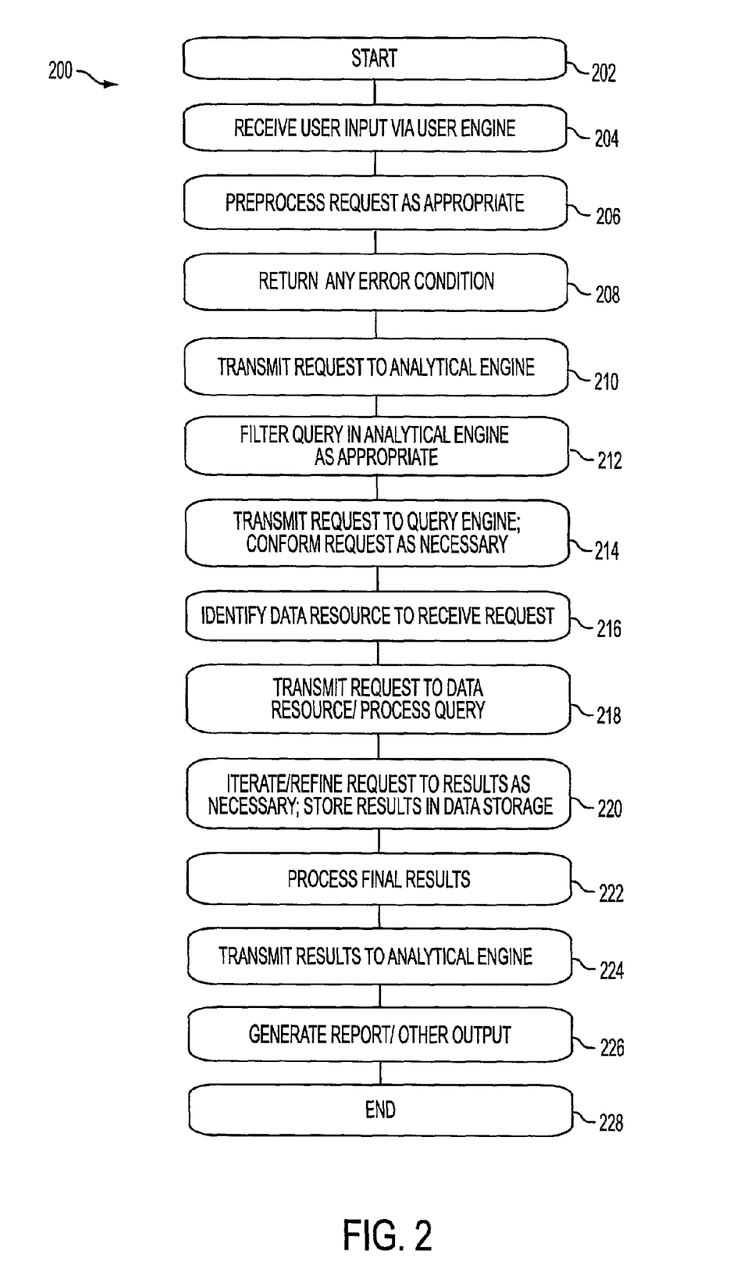
FIG. 2 is a flowchart illustrating steps performed by a process utilizing a query engine according to an embodiment of the invention.

While the present invention relates to exporting of reporting system report results to a datamart, it is helpful to review an embodiment of a system in which this invention may be used, as shown in FIG. 2.

Figure 1:
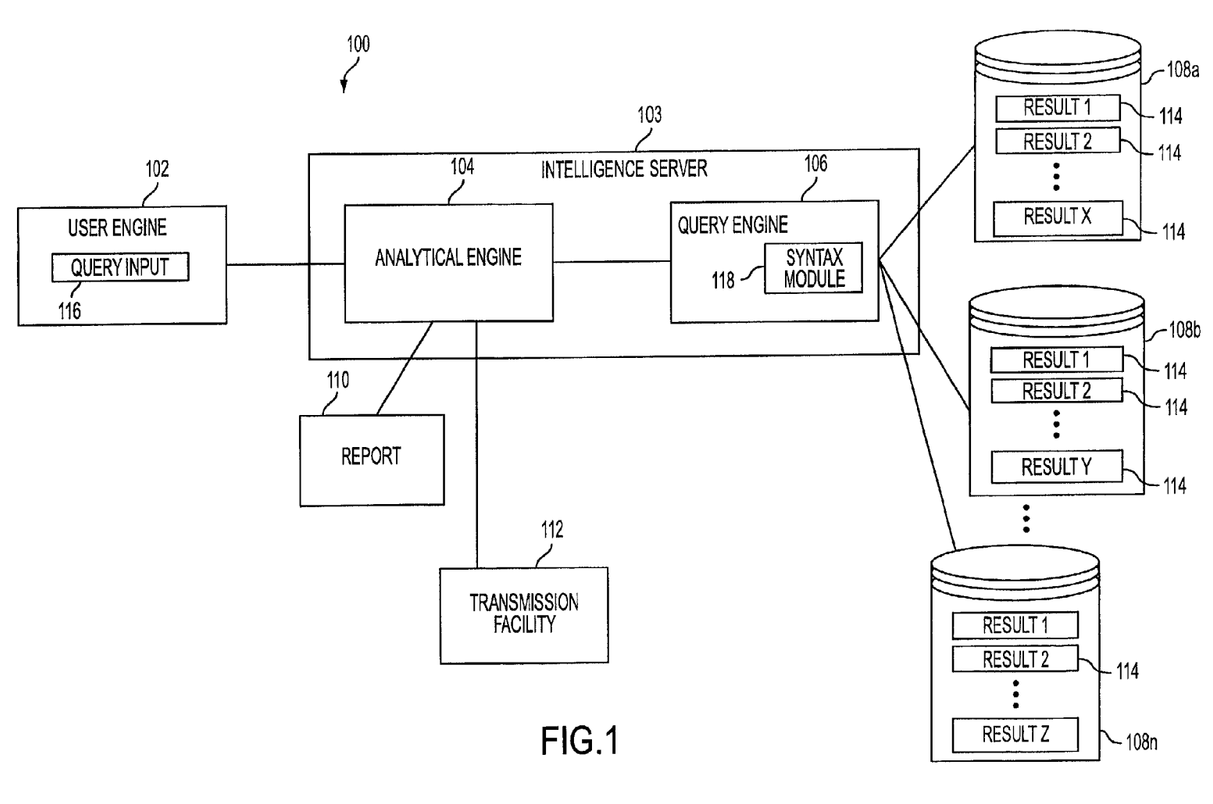
FIG. 1 is a block diagram illustrating an architecture for a system according to an embodiment of the invention.

FIG. 1 is a block diagram illustrating a system 100 by which a variety of data resources may be accessed for business analytic, report generation and other intelligence purposes 1 according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . .

108*n* may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108*a*, 108*b* . . . 108*n* are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108*a*, 108*b* . . . 108*n* may be supported by a server or another resource and may, in some embodiments, include redundancy, such as a redundant array of independent disks (RAID), for data protection. The storage capacity of any one or more of the data storage devices 108*a*, 108*b* . . . 108*n* may be of various sizes, from relatively small data sets to very large database (VLDB)-scale data sets, such as warehouses holding terabytes of data or more. The fields and types of data stored within the data storage devices 108*a*, 108*b* . . . 108*n* may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108*a*, 108*b* . . . 108*n*. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108*a*, 108*b* . . . 108*n* in its original format. If so, the query engine 106 may directly transmit the query to one or more of the resources of the data storage devices 108*a*, 108*b* . . . 108*n* for processing.

If the transmitted query cannot be processed in its original format, the query engine 106 may perform a translation of the query from an original syntax to a syntax compatible with one or more of the data storage devices 108*a*, 108*b* . . . 108*n* by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108*a*, 108*n* . . . 108*n* for processing. In some embodiments, the query may be processed for one or more hits against one or more databases in the data storage devices 108*a*, 108*b* . . . 108*n*. For example, a manager of a restaurant chain, a retail vendor or another similar user may submit a query to view gross sales made by the restaurant chain or retail vendor in the State of New York for the year 1999. The data storage devices 108*a*, 108*b* . . . 108*n* may be searched for one or more fields corresponding to the query to generate a set of results 114.

Although illustrated in connection with each data storage device 108 in FIG. 1, the results 114 may be generated from querying any one or more of the databases of the data storage devices 108*a*, 108*b* . . . 108*n*, depending on which of the data resources produce hits from 1 processing the search query. In some embodiments of the system 100 of the invention, the results 114 may be maintained on one or more of the data storage devices 108*a*, 108*b* . . . 108*n* to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108*a*, 108*b* . . . 108*n*. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 Patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 Patent. The platform of FIG. 1 may have many other uses, as described in detail with respect to the MicroStrategy 7 and 7.1 platform, the details of which will be appreciated by one of ordinary skill in the reporting and decision support system art.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure 1 that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
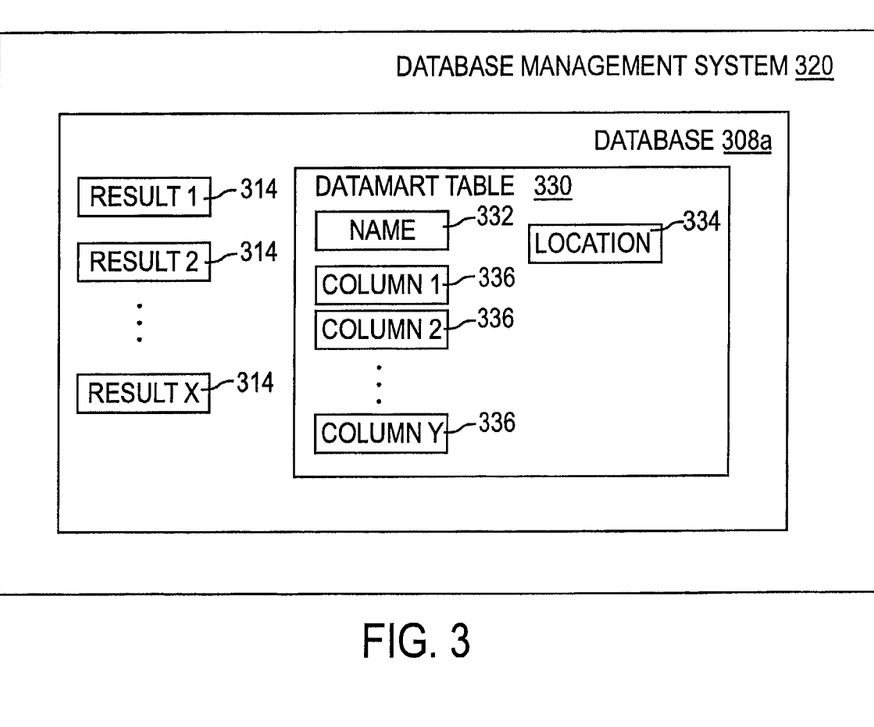
FIG. 3 is a block diagram illustrating one embodiment of a datamart table in a database management system.

In an embodiment of the invention illustrated in FIG. 3, the results 114 used in report 110 may be exported to a designated format. For example, the results 114 may be exported to report specific tables, such as "datamart" tables 330, in the data storage devices 108a, 108b . . . 108n or in user data storage devices. Other formats to which the results 114 may be exported include PDF file, flat file, Excel™ or other spreadsheet file, HTML file, and XML file or to another RDBMS format.

FIG. 3 is a block diagram illustrating one embodiment of a datamart table 330. The datamart table is a relational table associated with datamart-designated reports of the reports 110. The datamart-designated report is a report that allows the report owner to specify the name of the result table that is associated with that report.

Database management system ("DBMS") 320 includes database 308a, results 314 and datamart table 330. Datamart table 330 includes a table name 332, a table location 334 and column names 336. One or more of the table name 332, table location 334 and column names 336 may be specified by a user via user engine 102. The column names 336 may include attribute names and metric names. Results 314 may be inserted into the datamart table 330 either after the query results 314 have been processed in step 220 or after analytical measures are performed on the results in step 224.

Figure 4:
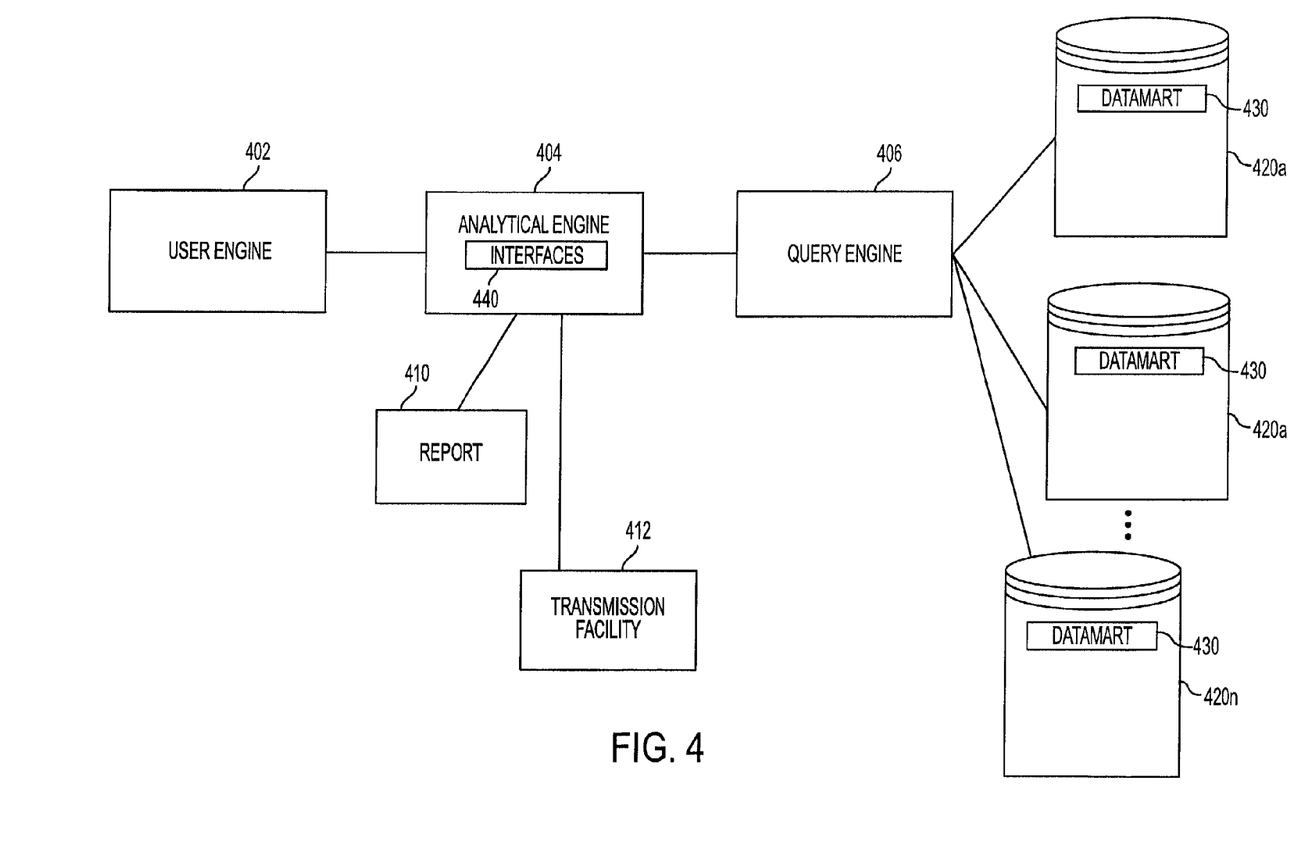
FIG. 4 is a block diagram illustrating one embodiment of the network architecture including datamarting capability.

Although the results 314 and datamart table 330 are shown to reside in the same DBMS 320, the results 314 and datamart table 330 may reside in separate databases 108a, 108b . . . 108n or separate DBMS 320a, as illustrated in FIG. 4.

FIG. 4 is a block diagram illustrating one embodiment of the network architecture including a datamarting capability according to an embodiment of the invention. Network 400 may include user engine 402, analytical engine 404, query engine 406, report 410 and transmission facility 412. Network 400 may further include database management systems 420a, 420b . . . 420n. Analytical Engine 404 may include report result interfaces 440.

The datamarts 430 may all reside on the same DBMS, such as DBMS 420a, or different DBMS 420a, 420b . . . 420n. The datamart 430 created for a designated report 410 may reside on the same DBMS 420a, 420b . . . 420n as the results 414 of the designated report or on a different DBMS 420a, 420b . . . 420n than the results 414. A export-designated report 410 may contain multiple datamarts 430 which target different physical database 108a, 108b . . . 108n from the results database 108a, 108b . . . 108n. Thus, datamarting in the query engine 406 is able to support multiple database connections inside one report execution.

In one embodiment, the multiple database connections may be supported through the use of a flag in the query. If the flag is true, a different database connection is created in the query execution loop. If the flag is not set, the Query Engine 406 continues to use the previous database connection to run the query.

In one embodiment, the results 414 from report 410 may be exported into other applications having different formats than the report 410. The exporting of the results 414 may support export of the results 414 into a file type of the user's selection including PDF, flat file, Excel™, HTML, and XML or to another RDBMS.

In one embodiment, to export a results 414 into an Excel™ file, a C++ Excel™ Automation may be implemented using Safe Arrays. In another embodiment, the results 414 may be written directly to an Excel™ file format (Binary Interchange File Format or BIFF) without using Excel™ on the server and without formatting the data in the results 414. In a third embodiment, the results 414 data may be formatted directly to an Excel™ file format or BIFF without using Excel™ on the server. In a fourth embodiment, XML data may be sent to a Formula One ActiveX Server DLL where Formula One may populate and format the data in the Excel™ file, save the Excel™ file and return the Excel™ file to the browser. The Excel™ file may be displayed using Excel™ or a Excel™ viewer on the browser.

Since the export-designated report 410 supports the writing back of result 414 from Analytical Engine 404 to the specified database 420a, 420b . . . 420n, the Analytical Engine 404 provides interfaces 440 to allow Query Engine 406 to get the final result 414 in the format that allows insertion into the datamarts 430 or other formats for exporting. In one embodiment, query engine 406 may call the bulk insertion function of the DBMS 420a, 420b . . . 420n to write the result into the DBMS 420a, 420b . . . 420n. Bulk insertion is a way to enter data into a database management system that is much faster than issuing SQL INSERT statements.

In another embodiment, the analytical engine 404 may have the capability to run queries. Thus, after advanced processing is performed on the results 414, the analytical engine 404 may run queries to insert the results 414 into datamarts 430. Insertion of the results 414 into the datamarts 430 is described in more detail below with reference to FIG. 5.

Figure 5:
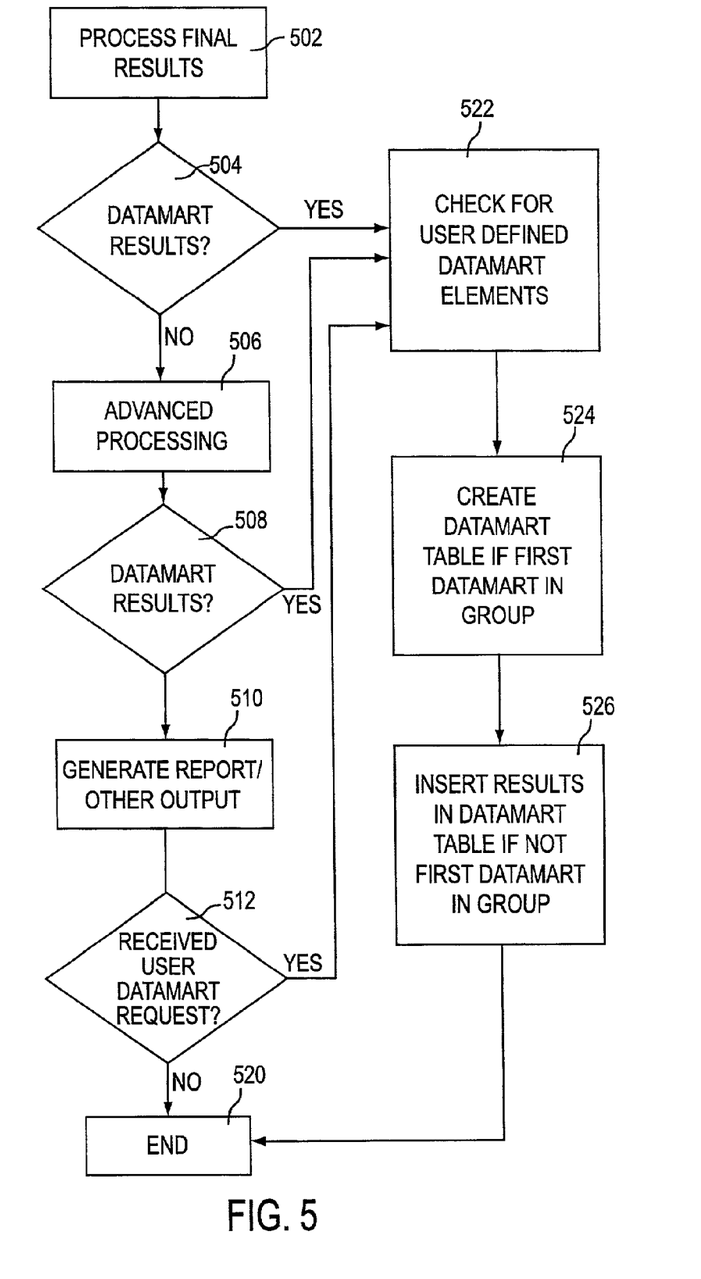
FIG. 5 is a flow diagram illustrating the populating of datamarts 430.

FIG. 5 is a flow diagram illustrating the populating of datamarts 430. At step 502, final processing of results 414 is performed as described with reference to step 220 of FIG. 2. At step 504, the query engine checks if the results 414 associated with the report 410 should be datamarted or exported. If the results 414 do not need further analytical processing and the report is a datamart report or export report, the results 414 may be exported or datamarted. Datamarting will be described below with reference to steps 522, 524 and 526.

If the results 414 are not to be exported or need further analytical processing, the query engine will transmit the results 414 to analytical engine 406 for advanced processing in step 506. The advanced processing may include performing metric limits, consolidations, custom groupings, subtotaling and ranking.

At step 508, the query engine may again check if the report 410 is designated for exporting. If the report is designated for datamarting, the results 414 may be datamarted in steps 522, 524, 526. If the report is to be exported, the results may be exported to a predetermined format or a format designated by the user. If the report is not designated for datamarting, the report may be generated and transmitted to the user in step 510.

At step 514, the query engine may determine if the user has designated the report as a datamart or export report after the report has been generated. For example, the user may view the report and realize that the data in the report is important. Thus, user may decide to datamart the report after reception of the report. If the report results are to be datamarted, the process proceeds to step 522. If the report results are to be exported to another format, the results may exported to a predetermined format or a format designated by the user.

If the user has not designated the report 410 for datamarting, the process ends at step 520.

Datamarting is performed at steps 522, 524 and 526. At step 522, the query engine checks if the user has defined elements of the datamart table 330 such as table location 334, table name 332 and column names 336. If the user has defined at least some of the elements 332, 334, 336, the query engine uses these elements to create or insert the results 114 in the datamart(s) 430 at step 524.

In one embodiment, the user may specify a fixed name for a datamart table 430 from a GUI. The query engine 406 may use the fixed name directly in the queries for creating the datamart table 430. In another embodiment, the user may be allowed to specify a dynamic name for the datamart table 430. The dynamic name may be a name pattern for guiding a query forming engine, such as a SQL engine, to generate the table name 332 at running time. The pattern may include the date on which the table 430 was created, an index number, the name of the report 410 used to make the datamart table 430, and/or the login name of the user executing the report 410.

For the column names 336, the users may specify an alias for each attribute form and each metric in the attribute form. If the users do not specify column names, the query forming engine will use the default column alias for the attribute form and generate a column alias for the metric by using the name of the metric. For custom groups and consolidations, the query forming engine may generate predetermined columns if none are specified by the user. For example, for custom groups, the query forming engine may generate several columns including filter key, filter description, element identification, element description and band index (if there is a band operator). For consolidation, the query forming engine may generate columns for element identification and element description.

At step 524, if more than one datamart 430 is generated for a report 410, the datamarts 430 may be grouped according to the datamart's 430 destination DBMS 420a, 420b . . . 420n. For each group of datamarts 430, a datamart creating query is run by the query engine 406 for the first datamart 430 in the group to insert the first datamart 430. After the datamart table 430 has been created, the remaining datamarts 430 in the group may be inserted in the datamart table 430 at step 526. The query used by the query engine 406 to insert the datamarts 430 may include a mapping structure to describe the mapping between each column of the datamart table 430 and the template units of the report 410.

The datamarts may be used for many types of applications including tabulating evaluation characteristics, segmenting customers, generating mailing labels, aggregating tables and implementing compiled filters (e.g., using the output results from one report as an input filter into another report). The datamarts may be used in a variety of applications including, for example, Strategy.com™.

For example, in a financial services company, datamarting may be used to create different fact sheets from the same report. One report may include a stock identification column with a column for alpha of the stock (a performance indicator based on historical data) and a column for beta of the stock (a measure of volatility based upon historical data). The alpha and beta measurements may use the analytical engine 404 for calculation. Another report may list a variety of stock performance indicators (e.g., Bollinger Bands, stochastic movement, momentum, moving averages, etc.) for each stock, depending on indicators chosen by the user. Thus, the analytical engine 404 may be used for calculation of the various stock performance indicators.

Other embodiments and uses of the invention will be apparent to those skilled in the art from consideration of the specification and practice of the invention disclosed herein. The specification and examples should be considered exemplary only.

What is claimed is:

1. A method for automatically exporting results from a reporting system, comprising the steps of:
    receiving a selection of an export-designated report to be processed by the reporting system;
    generating a plurality of datamarts associated with the selected export-designated report, wherein each of the plurality of datamarts corresponds to a datamart table of a plurality of datamart tables;
    generating one or more datamart create queries for each of the plurality of datamarts, wherein at least one datamart create query inserts a datamart table in a destination database management system;
    exporting results from the export-designated report from the reporting system to at least one predetermined format accessible by a user device, wherein the results are exported automatically without user input at a report execution time, and wherein exporting the results from the export-designated report comprises exporting the results from the destination database management system to a plurality of datamart tables corresponding to the plurality of datamarts, wherein the at least one destination database management system comprises a different database management system than a database management system of the reporting system, wherein multiple database connections are supported inside a report execution for exporting the results from the destination database management system; and enabling a user of the user device after receiving the export-designated reports to designate the export-designated report for further result exporting by the reporting system.

2. The method of claim 1, wherein receiving a selection of an export-designated report comprises automatically forwarding one or more reports to the user and enabling the user to designate the one or more reports for result exporting after receiving the one or more reports.

3. The method of claim 1, wherein receiving a selection of an export-designated report comprises enabling the users to designate the one or more reports as the export-designated report when the users select portions of service to receive as a report.

4. The method of claim 1, wherein the at least one predetermined format is exported to at least one database management system.

5. The method of claim 1, further comprising performing at least one of analytical calculations and post-processing.

6. The method of claim 1, further comprising enabling the user of the user device to specify at least one of a table name, a table location and column names for a user table and exporting the results from the export-designated report comprises exporting the results to the user table.

7. The method of claim 1, wherein exporting the results from the export-designated report comprises bulk inserting the results in a preexisting table associated with the plurality of datamart tables in the at least one predetermined format.

8. The method of claim 7, wherein the bulk inserting the results in the preexisting table leverages bulk insert capabilities of a relational database, a file system, or the data management system.

9. The method of claim 1, wherein exporting the results from the export-designated report comprises automatically forwarding the results to the user based on a schedule.

10. The method of claim 1, wherein exporting the results from the export-designated report to at least one predetermined format accessible by the user device further comprises exporting the results to a flat file, another relational database management system format, a XML file, a spreadsheet file, a HTML file and a portable document format file.

11. The method of claim 1, wherein exporting the results from the export-designated reports comprises exporting at least one of hypertext markup language data and extensible markup language data to a spreadsheet format file.

12. The method of claim 1, wherein use of the multiple database connections is enabled by an indicator in a query associated with the one or more designated reports.

13. The method of claim 1, wherein the user of the user device specifies a format for further result exporting by the reporting system.

14. A system for automatic exporting of results from a reporting system, the system comprising a processor and a memory storing instruction means coupled to the processor that when executed causes the processor to perform the following steps:

receive a selection of an export-designated report to be processed by the reporting system;

generate a plurality of datamarts associated with the selected export-designated report, wherein each of the plurality of datamarts corresponds to a datamart table of a plurality of datamart tables;

generate one or more table create queries for each of the plurality of datamarts, wherein the table create query inserts a first export datamart table in a destination database management system; and export the results from the export-designated report to at least one predetermined format accessible by a user device, wherein the results are exported automatically without user input at a report execution time, and wherein exporting the results from the export-designated report comprises exporting the results from the destination database to a plurality of datamart tables corresponding to the plurality of datamarts, wherein the at least one destination database management system comprises a different database management system than a database management system of the reporting system wherein multiple database connections are supported inside a report execution for exporting the results from the destination database management system; and enable a user of the user device after receiving the one or more designated reports to designate the export-designated report for further result exporting by the reporting system.

15. The system of claim 14, wherein the processor further performs a step to enable the user to designate the export-designation report for exporting at a time of the user selection of report elements and after receiving the export-designated report.

16. The system of claim 14, wherein the multiple database connections are supported for processing of the export-designated report.

17. The system of claim 16, wherein use of the multiple database connections for the processing of the export-designated report is enabled by an indicator in a query associated with the one or more designated reports.

18. The system of claim 14, wherein the user of the user device specifies a format for further result exporting by the reporting system.

19. A non-transitory processor usable medium having processor readable program code embodied therein for automatically exporting results from a reporting system, the computer readable code comprising:

processor readable code for causing at least one processor to operate so as to:

receive a selection of an export-designated report to be processed by the reporting system;

generate a plurality of datamarts associated with the selected export-designated report, wherein each of the plurality of datamarts corresponds to a datamart table of a plurality of datamart tables;

generate one or more datamart create queries for each of the plurality of datamarts, wherein at least one datamart create query inserts a datamart table in a destination database management system;

export results from the export-designated reports from the reporting system to at least one predetermined format accessible by a user device, wherein the results are exported automatically without user input at a report execution time, and wherein exporting the results from the export-designated report comprises exporting the results from the export-designated report to a plurality of datamart tables corresponding to the plurality of datamarts, wherein the destination database management system comprises a different database management system than a database management system of the reporting system, wherein multiple database connections are supported inside a report execution for exporting the results from the destination database management system; and enable a user of the user device after receiving the export-designated report to designate the export-designated report for further result exporting by the reporting system.

20. The non-transitory processor usable medium of claim 19, wherein the multiple database connections are supported for processing of the export-designated report.

21. The non-transitory processor usable medium of claim 20, wherein use of the multiple database connections for the processing of the export-designated report is enabled by an indicator in query associated with the one or more reports.

22. The non-transitory processor usable medium of claim 19, wherein the user of the user device specifies a format for further result exporting by the reporting system.

* * * * *